No. 784,443. PATENTED MAR. 7, 1905.
R. C. STARBARD.
BRAKE FOR BABY CARRIAGES.
APPLICATION FILED JULY 19, 1904.
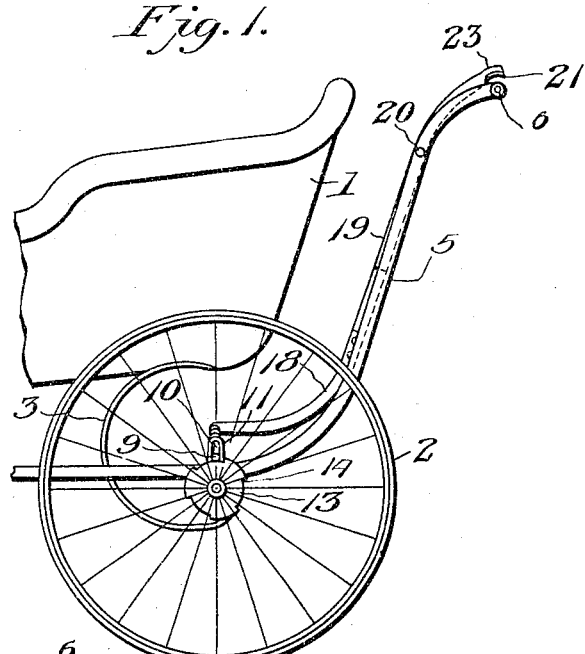
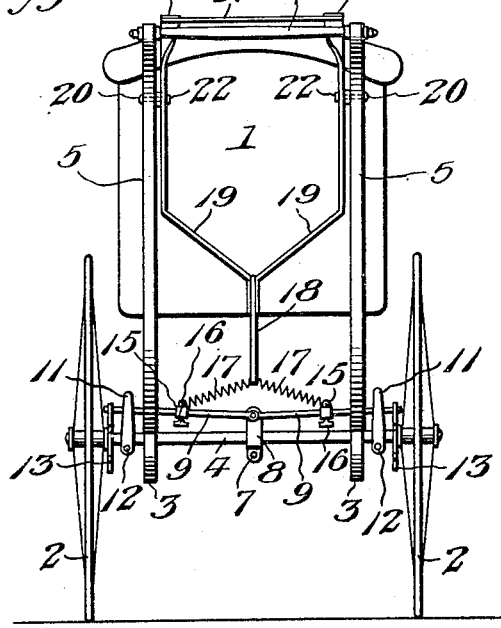
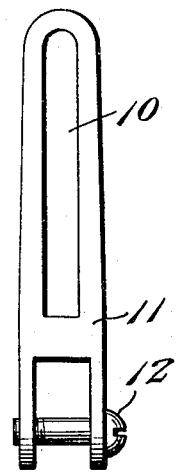
Witnesses
Edwin F. McKee
W. H. Clarke
Inventor
Raymond C. Starbard
By Victor J. Evans
Attorney No. 784,443.

Patented March 7, 1905.

UNITED STATES PATENT OFFICE.

RAYMOND C. STARBARD, OF MILFORD, MASSACHUSETTS.

BRAKE FOR BABY-CARRIAGES.

SPECIFICATION forming part of Letters Patent No. 784,443, dated March 7, 1905.

Application filed July 19, 1904. Serial No. 217,231.

*To all whom it may concern:*

Be it known that I, RAYMOND C. STARBARD, a citizen of the United States, residing at Milford, in the county of Worcester and State of Massachusetts, have invented new and useful Improvements in Brakes for Baby-Carriages, of which the following is a specification.

This invention relates to brakes for baby-carriages.

The principal objects of the invention are to improve and simplify the construction of such brakes and to decrease the expense attending their manufacture.

A further object of the invention is to render such brakes capable of being applied to and removed from baby-carriages without difficulty.

With the foregoing and other minor objects in view, which will appear as the description proceeds, the invention resides in the novel combination and arrangement of parts and in the details of construction hereinafter described and claimed as an embodiment of the invention.

In the accompanying drawings, forming part of this specification, Figure 1 is a side elevation of the baby-carriage, showing the improved brake of this invention applied to the rear wheels thereof. Fig. 2 is an end elevation of the carriage. Fig. 3 is a perspective view of a guide-bracket.

Like reference-numerals indicate corresponding parts in the several views.

The baby-carriage may be of any suitable form and construction, comprising, preferably, a body 1, wheels 2, springs 3, axle 4, handle-supports 5, and handle 6. Removably mounted upon the center of the axle 4 by means of a screw 7 is a bracket 8, in which are pivoted two oppositely-extending brake elements or bars 9. Each of the bars 9 extends through a slot, such as 10, in a guide-bracket 11, removably secured, by means of a screw 12, upon the axle 4. The free end of each brake element or bar 9 is adapted to move into or out of engagement with a wheel element, such as 13, which consists, preferably, of a disk secured to the wheel in any suitable manner, so as to rotate therewith and having an irregular periphery formed by projections or shoulders, such as 14. Mounted upon each of the brake-bars 9 is a longitudinally-adjustable sleeve or bracket 15, the adjustment of which is secured by means of a turn-screw 16. Connected with each of the longitudinally-adjustable brackets 15 is a coil-spring 17. Each of the coil-springs 17 is attached to the lower end of a lever 18, formed with diverging arms 19. The diverging arms of the lever 18 are pivoted at 20 to the handle-supports 5, and said diverging arms are connected by a cross-piece or semicylindrical shell 21, which lies in parallel relation with the handle 6 and is adapted to be forced closely against said handle when gripped in the hands of the person pushing the carriage. It will be observed that the pivot-point 20 of the diverging arms 19 of the lever 18 is located a considerable distance away from the central portion of the lever, whereby the lower portion of the lever is much more heavy than the upper portion thereof, and it will be observed that the upper end 23 of each diverging arm 19 is twisted in such manner that it will lie flat against the handle 6 of the carriage, and thus permit the shell 21 to fit closely against said handle.

Constructed as above described the operation of the improved brake is as follows: When the cross-piece or shell 21 is forced close against the handle 6, the lower end of the lever 18 draws upwardly upon the coil-springs 17, causing the brake elements or bars 9 to be raised in the guide-brackets 10 until they are out of engagement with the wheel elements or disks 13, thus permitting the baby-carriage to be pushed without difficulty. When the hands of the person who is pushing the baby-carriage are removed from the handle 6, the heavy lower end of the lever 18 descends, whereby the brake elements or bars 9 are permitted to descend by gravity until they rest upon the irregular periphery of the wheel elements or disks 13 and prevent any accidental rotation of the wheels.

By means of the longitudinally-adjustable brackets 15 the tension of the coil-springs 17 may be regulated at will, so that said springs will act quickly to withdraw the brake elements or bars 9 from contact with the irregular peripheries of the disks or wheel elements 13 when it is desired again to push the carriage. By adjusting the brackets or sleeves 15 toward each other, or, in other words, toward the pivoted ends of the brake elements or bars 9, the coil-springs 17 may be compressed in such manner that the descent of the lever 18 when the handle-bars are released will cause the brake elements or bars 9 to be thrown positively into contact with the irregular peripheries of the wheel elements or disks 13 through the expanding action of the coil-springs 17.

By reason of the fact that the brackets 8 and 11 are removably secured upon the axle 4 and that the pivotal connections 20 of the diverging arms 19 of the lever 18 preferably are formed by means of headed bolts 22 the entire brake which has been described may be removed without difficulty from the baby-carriage, leaving only the wheel elements or disks 13 in position. In this connection it will be understood that, if desired, the brake elements or disks 13 may be removably attached in any suitable manner (not shown) with the wheels of the baby-carriage.

Minor changes in the precise embodiment of the invention illustrated and described may be made within the scope of the following claims without departing from the spirit of the invention or sacrificing any of its advantages.

The improved brake of this invention effectually prevents the baby-carriage from running away in the event that the hands of the person pushing the carriage are removed from the carriage while on a hill or incline or while a child is pushing the carriage. Furthermore, when women are shopping the carriage may be easily locked against movement by releasing the hands from the handle.

If the carriage be pushed forward a slight distance before the shell 21 be forced against the handle to release the brakes, the brake-bars 9 will bind against the irregular peripheries of the wheel elements 13 in such manner as to render it difficult to withdraw said brake-bars from said wheel elements in order to push the carriage forward. Should this occur, it is necessary only to pull the carriage backward to a slight extent without removing the hands from the handle. This slight backward movement of the carriage will cause the brake-bars to unbind from the wheel elements or irregular disks, and the coil-spring 17 will then act immediately to raise the brake-bars away from the wheel elements or disks, and thus permit the carriage to be pushed forward.

Having thus fully described the invention, what is claimed as new is—

1. The combination with a baby-carriage, of a wheel element, a brake element adapted to be moved by gravity into contact with the wheel element, a lever, and a spring element connecting the brake element and the lever, for normally maintaining the brake element out of contact with the wheel element.

2. The combination with a baby-carriage, of pivoted brake elements, a lever having diverging arms pivoted to the handle-supports of the carriage, a cross-piece connecting the diverging arms of the lever, and a plurality of coil-springs connecting the brake elements with the lever.

3. The combination with a baby-carriage having wheels, an axle, handle-supports, and a handle, of a bracket removably mounted upon the axle, a plurality of brake-bars pivoted upon the bracket and extending in opposite directions, a longitudinally-adjustable bracket upon each of the brake-bars, a lever having diverging arms pivoted to the handle-supports of the carriage above the middle portion of the lever, a shell or cross-bar connecting the diverging arms of the lever and lying in parallel relation with the handle of the carriage, and a coil-spring connected with each of the longitudinally-adjustable brackets and with the lower end of the lever.

4. The combination with a baby-carriage having wheels, an axle, handle-supports, and a handle, of a disk formed with an irregular periphery and mounted to rotate with each of the wheels, a supporting-bracket removably mounted upon the axle, a plurality of guide-brackets having slots therein and being removably mounted upon the axle, a plurality of brake-bars pivoted upon the supporting-bracket and extending in opposite directions, a longitudinally-adjustable bracket on each of the brake-bars, a coil-spring connected with each of the longitudinally-adjustable brackets, a lever connected with each of the coil-springs and having diverging arms pivoted upon the handle-supports of the carriage, the pivot-point of the lever being above the central portion thereof, and the upper end of each diverging arm being twisted, and a shell connecting the upper ends of the diverging arms and lying in parallel relation with the handle of the carriage.

In testimony whereof I affix my signature in presence of two witnesses.

RAYMOND C. STARBARD.

Witnesses:
  WENDELL WILLIAMS,
  GUSTAVUS B. WILLIAMS.